United States Patent [19]
Chromie

[11] 4,229,076
[45] Oct. 21, 1980

[54] SOLAR ENERGY CONCENTRATOR

[76] Inventor: Edsel Chromie, 6720 Belle Glade, San Diego, Calif. 92119

[21] Appl. No.: 922,857

[22] Filed: Jul. 10, 1978

Related U.S. Application Data

[63] Continuation-in-part of Ser. No. 735,593, Oct. 26, 1976, Pat. No. 4,144,716.

[51] Int. Cl.³ .............................................. G02B 5/08
[52] U.S. Cl. ...................................... 350/292; 264/1; 350/320
[58] Field of Search .................... 264/1; 350/292, 299, 350/320; 126/438, 439

[56] References Cited

U.S. PATENT DOCUMENTS

| | | | |
|---|---|---|---|
| 2,846,724 | 8/1958 | Aylwin | 350/292 X |
| 2,945,417 | 7/1960 | Caryl et al. | 350/292 X |

*Primary Examiner*—F. L. Evans
*Attorney, Agent, or Firm*—Frank D. Gilliam

[57] ABSTRACT

A solar light energy concentrator comprising a flat rectangular base member on which are positioned and secured a plurality of rectangular glass mirror segments which have a common focal point centrally positioned above the base member. Any voids between the mirror segments and the base member are filled with a filler material to form a smooth rigid structure. A method of constructing a solar light energy concentrator and the concentrator constructed thereby is disclosed.

12 Claims, 6 Drawing Figures

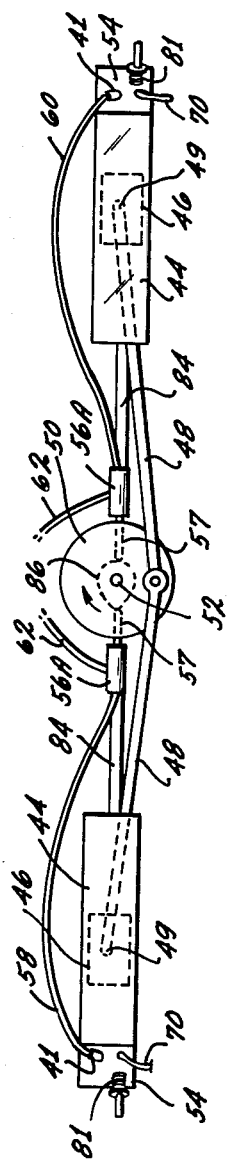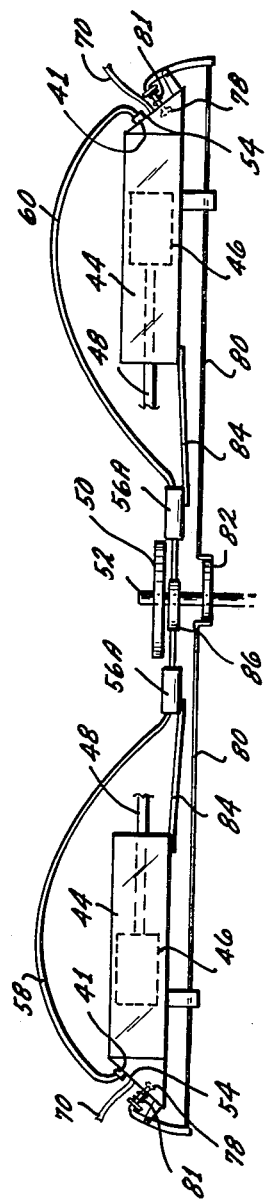

SOLAR ENERGY CONCENTRATOR

This is a continuation-in-part of application Ser. No. 735,593, filed Oct. 26, 1976, now U.S. Pat. No. 4,144,716.

BACKGROUND OF THE INVENTION

The present invention relates to solar light energy concentrators and more specifically to a solar light concentrator having a plurality of small reflective surfaces fixedly positioned on a flat platform, each reflective surface having a common focal point and the method of making same.

There are several prior art devices that utilize solar light energy concentrators for producing heat energy at an elevated temperature.

U.S. Pat. No. 1,424,932 teaches a parabolic reflector system to form a concentrator. This system teaches the forming of a parabolic surface and a plurality of different focal points around the surface of the steam boiler.

U.S. Pat. No. 1,386,781 teaches a solar concentrator device.

U.S. Pat. No. 3,892,433 teaches the use of a plurality of curved reflectors positioned to direct solar energy to a plurality of focal points on a steam generator. The positioning of the reflectors requires an equal plurality of optical sensors and sensor-servo mechanisms.

These prior art systems are complicated, inefficient and economically expensive to produce.

SUMMARY OF THE INVENTION

The present invention provides an efficient, uncomplicated and reasonably inexpensive means for converting solar light energy into useful work. The Sun's light rays are concentrated at a single focal point on a flash steam boiler to maximize the heat at the boiler. The operating mechanism is enclosed in a solar heat collector panel so as to elevate the temperature of the entire system to provide increased operational efficiency. The collector tracks the relative movement of the Sun and Earth by sensor controlled motor means so as to maintain the maximum heat at the flash steam boiler during Sun light hours.

The main object of this invention is to utilize the heat energy of the Sun's rays in the production of electrical power.

Another object of this invention is to devise an apparatus of extremely high efficiency which will obtain the maximum result from the Sun's rays for the maximum time period.

A further object of the invention is to provide a solar energy concentrator of maximum efficiency occupying a minimum of vertical space.

A further object of the invention is to provide a low cost, light weight, and uncomplicated solar energy concentrator.

The foregoing objects, features, advantages and results of the present invention, together with various other objects, advantages, features and results thereof which will be evident to those skilled in the solar energy art in the light of the disclosure, may be achieved with the exemplary embodiment of the invention illustrated in detail hereinafter.

DESCRIPTION OF THE DRAWINGS

FIG. 5 is a plan view, partially in phantom, of the injector pumps and their operating mechanism; and FIG. 6 is a side view of the FIG. 5 showing further including the valves and their operating mechanism.

DESCRIPTION OF THE PREFERRED EMBODIMENT

Figure 1:
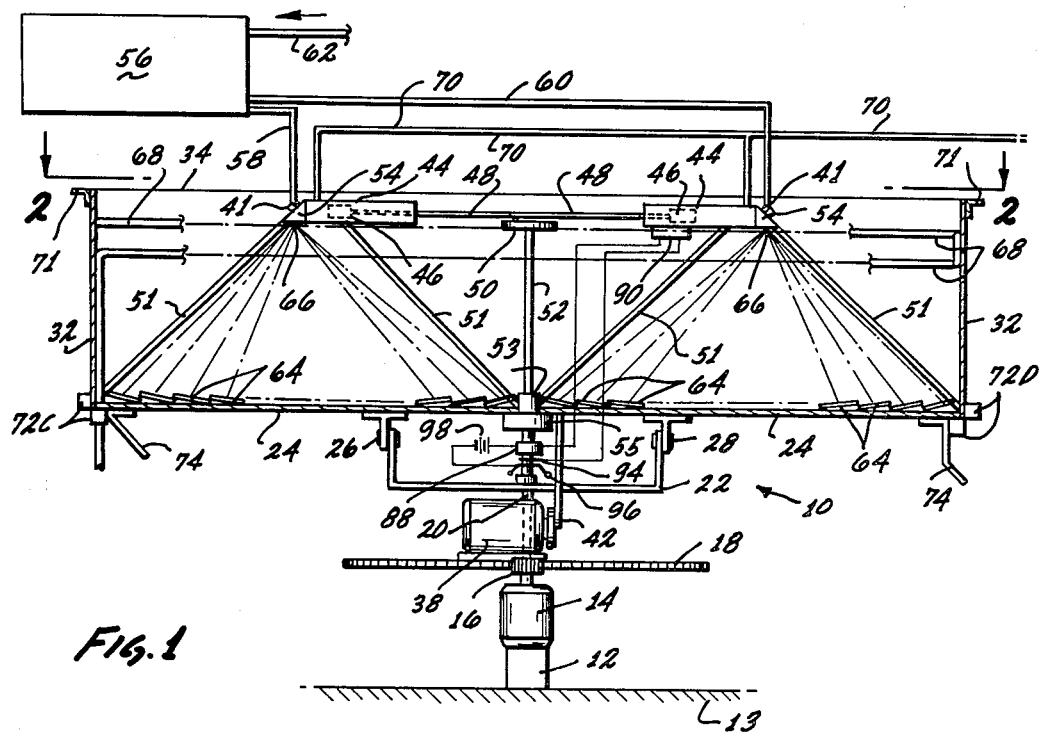
FIG. 1 is a partially cutaway side view of the apparatus of the invention.

The same reference numerals are used throughout the Figures and specifications to depict the same element or part.

Figure 2:
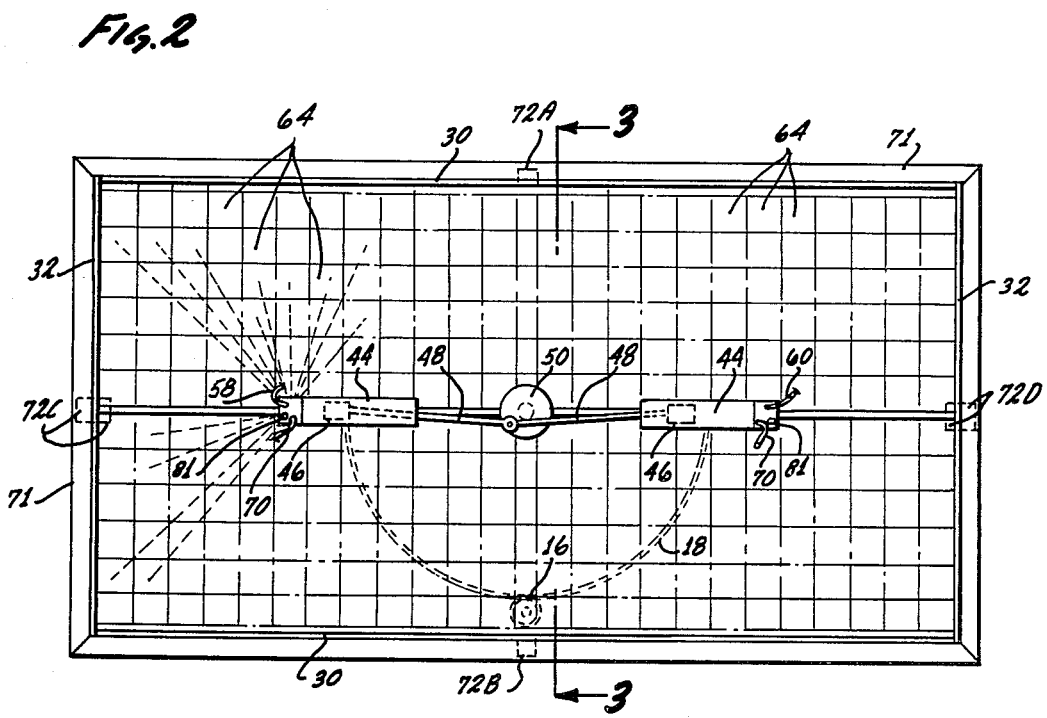
FIG. 2 is a plan view of the reflective surface of the solar concentrator of the invention.
Figure 3:
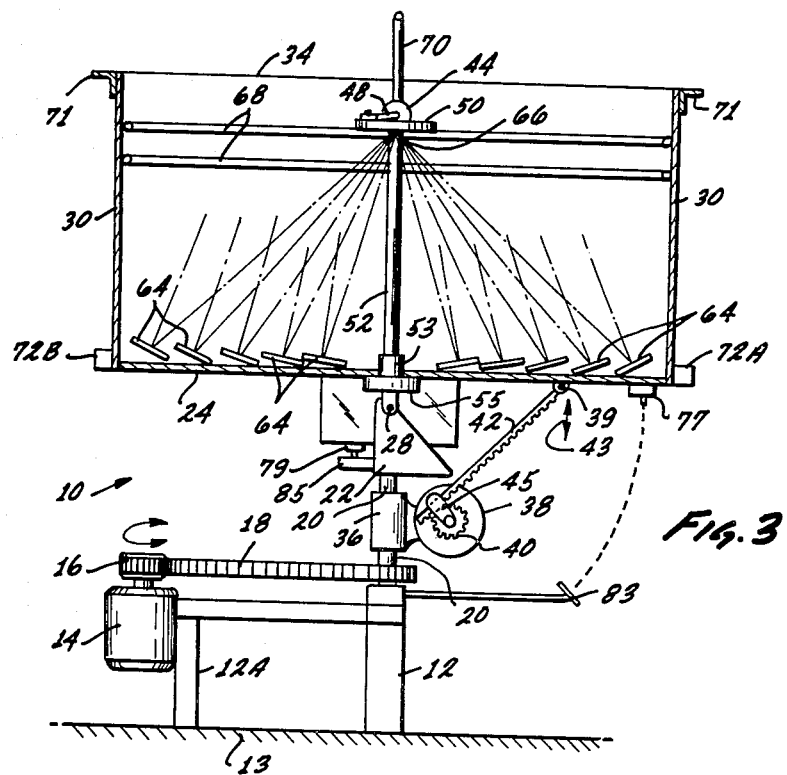
FIG. 3 is a partially cutaway view of the apparatus of the invention taken along lines 3—3 of FIG. 2.

Referring now specifically to FIGS. 1, 2, and 3, a combination solar light energy collector and concentrator 10 is shown. The apparatus is supported by a base 12, 12a attached to a surface positioned on the Earth 13, an example would be a support member buried in the ground to a sufficient depth and having sufficient mass to easily support the apparatus 10. The base 12a supports a motor 14 which drives a gear 16 attached to the motor shaft. Gear 16 drives a larger semi-circular gear 18. The gear 18 is fixedly attached to shaft 20 which is fixedly attached to the collector bracketry 22. Shaft 20 is rotatably attached to the base member 12 thus allowing the base free rotational movement relative thereto.

Pivotly attached to bracketry 22 is the collector bottom member 24. The bottom member 24 is allowed to pivot with respect to base member 12, 12a at its pivotal attachment points 26, 28. The collector further includes side members 30 and end members 32. The lid 34 of the collector is constructed of a light admitting material, such as, but not limited to, glass or plexi-glass. The lid, sides, ends and bottom make up an enclosure for the collection of solar energy. Insulation (not shown) is used to contain the heat within the collector.

A bracket 36 fixedly secured to shaft 20 supports a second motor 38. The rotation of motor 38 drives a gear 40. A gear rack 42 is pivotly attached at its upper end 39 to the collector bottom 24. The opposite end of the rack 42 is held in sliding engagement by bracket 45 which is free to pivot with respect to gear 40 and allows rack 42 to freely move therein when the gear 40 is caused to rotate. It can be readily seen that when the motor rotates, the rack will translate causing the collector to tilt downwardly from its FIGS. 1 and 3 position. Along arrow 43 within the limits of the length of the gear rack 42.

Positioned within the upper portion of the collector are two cylinders 44 which contain pistons 46 slidably engaged therein. The pistons are each connected to a connecting rod 48 by a conventional piston pin 49 (see FIG. 5) so that the connecting rod is free to move laterally with respect to the longitudinal movement of the piston. The ends of the connecting rods remote from their piston attached ends are pivotly connected to a central disk 50 (see the various figures). The disk 50, in some instances, will be required to have sufficient mass to act in the manner of a fly wheel.

It can be readily seen that as the pistons move within their respective cylinders, the disk 50 will rotate.

The disk 50 is secured to the end of a drive shaft 52 which passes through a slip guide 53 and is attached to a generator 55 for the production of electricity as the pistons move. It should be understood that drive shaft 52 may be utilized to perform any type of useful work and is not limited to the production of electricity.

The cylinders are supported by the lower surface 24 by any convenient manner so as to block as little of the Sun's rays striking the reflective surfaces as practical. Brackets 51 are an example of how this may be accomplished.

The generator 55 is secured either to the bracketry 22, the bottom 24 of the collector or through a supporting bearing on shaft 52, so that it can tilt or turn with the collector panel when motors 38 and 14 are energized.

At one end of cylinders 44 is positioned flash steam boiler 54. A pump 56 for pumping the pre-heated water or any suitable expandable fluid through the injectors 41 (shown in one variation) is interconnected to each of the two flash steam boilers through high pressure conduit 58, 60. The inlet to the pump 56 is connected to a source of pre-heated water (hereinafter discussed) through conduit 62. The output of the pump supplies water under increased pressure to a conventional injector 41, such as those used in the diesel engine art, which injects this water into the flash steam boiler 54.

A plurality of flat reflective surfaces 64 are supported by and cover the inner surface of bottom 24. The reflective surfaces are positioned and held in place so that each will reflect the light of the Sun shining thereon to a single focal point 66 on the lower surface of the flash steam boiler 54. It should be noted that the reflective surfaces shown are of sufficient area quantity to be equally divided between two focal points to operate two flash steam boilers 54.

One method of producing a concentrator of the instant invention is to produce a master concentrator to use as a master mold and from it duplicate concentrations as desired. Various sized concentrators of course would require various size master molds. The master or a single concentrator may be produced by the following method. A base member of the desired ultimate size concentrator is selected. A target member is then positioned vertically above the base member. The target member and base member have a relative fixed positional relationship. The target comprises a flat surface which is positioned substantially parallel with and facing the base member. The size of the flat surface of the target member is slightly larger than the reflective area of each of the plurality of reflective surfaces 64 that are to be positioned on the flat base member. The target size selected would be substantially the same size as the focal flat surface desired for the end use of the concentrator such as the flat surface of flash boiler 66. The separation distance between the target and the flat surface of the base member is determined by a combination of the size of the reflective surfaces, the size of the base member and the required target size. A typical example using a six foot square base member, a four inch target and reflective surfaces of approximately three inches square which may diminish in size as the reflective surface positions approach the periphery of the base member. In this example, the distance between the flat surface of the target member and the base member will be approximately twenty-one inches. If any of these typical dimensions are varied, then, understandably, the distance between the base member and the flat surface of the target may vary.

After the target member is fixedly positioned twenty-one inches above the base member, a four inch square is drawn at substantially the exact center of the base member. The base member is then aligned with the Sun so that the target member casts a shadow exactly in the four inch square. A reflective surface is then positioned and secured to the base member by adhesive means, tilted as required to align its Sun light reflection on the flat surface of the target member. A border of one-half an inch is left between the boundaries of the target member. This one-half inch border providing for a more accurate alignment of the remaining reflective surfaces, as hereinafter explained. This original positioned reflective surface is left exposed to Sun light throughout the alignment of the remaining plurality of reflective surfaces so that as each additional reflective surface is positioned and secured in place on the base member, each reflects the Sun's light on substantially the same spot as the first reflective surface. Each of the additional reflective surfaces are covered, so that they will not reflect the Sun's light after they are positioned on and secured to the base member to minimize the brightness on the target surface and to keep the reflection of each of the plurality of reflective surfaces on the target member more definite. As long as the target shadow is on the four inch defined mark on the base member and the original reflective surface is substantially centered on the flat surface of the target member, all additional reflective surfaces can easily be positioned to reflect the Sun's light on that same area. The target member is then removed.

After all the reflective surfaces are positioned, a filler may be used to provide a continuous surface or draft between the reflective surfaces that are tipped from the surface of the base member. When the reflective surfaces are glass mirrors, for example, dental plaster may be utilized for this purpose (obviously any other satisfactory filler could be used). After all the reflective surfaces are in position, the entire reflective surface is coated with a mold release material, such as, but not limited to wax and then a fiber glass, or like material, duplication is cast from it. This cast is then utilized as a master mold.

For additional panels of the same size and configuration, reflective surfaces of the same size as used to make the mold are placed reflective surface side down against the master mold which is coated with a mold release material as noted above and covered with a material suitable to set and hold all the reflective surfaces in the exact position as those of the original panel from which the master mold was made and to form a suitable base. One suitable material was found to be chopped fiberglass resin system sprayed on the reverse sides of the reflective surfaces. The master mold is then removed after the material suitable to set and hold the reflective surfaces and form the base is cured. The duplicate concentrator may also be constructed in a number of different ways other than described above. The master mold could be sprayed directly with a reflective material, the concentrator may be injection molded from the master mold using a reflective medium, the surface of the master mold may be duplicated by any known means and the duplicate sprayed or coated with a reflective outer surface, etc.

The principle advantage of this concentrator is that the focal point is established at the minimum vertical distance from the reflective surface for maximum efficiency. This importance is increased by the fact that light diminishes at a rate equal to the distance squared and it is the light energy that is reflected, not heat. The heat from the reflected light is radiated outward from the focal surface onto which the light is focused. Sun-light can be reflected through several sheets of translucent material, such as glass, without any possibility of heat transfer, but a non-translucent surface which the reflected light strikes will become hot from the light energy.

The use of small, flat, glass mirrors and a flat base member substantially reduces the economic cost of construction of the concentrator of the instant invention.

After the concentrator is cast, several panels can be mounted on a single frame-work, using a single tracking mechanism for their operation.

The reflective surface may be glass mirrors, however, the invention is not limited in this manner as any suitable reflective surface may be utilized equally as well to practice the invention.

The source of preheated water supplied to the pump 56 may be provided by the coil of conduit 68 positioned within the aforementioned collector, from any external heating means (not shown) or from a combination of the coil of conduit 68 and additional heat from an external source. It should be apparent that the heated water from the coil of conduit 68 may be used to supply heat requirements separate from the engine, as a conventional solar heater. The engine exhaust steam may be vented to atmosphere through conduit 70 in an open cycle system where the input to the coil of conduit 68 is supplied from an external source of water. Ideally, the engine steam exhaust is utilized in a closed system wherein the steam passes through an external heat exchanger where it is used for the heating of building, operating refrigeration apparatus or the like. The removal of heat from the steam in this manner acts as a condenser to cool the steam back to a water which is then returned to one end of the coil conduit 68, is reheated, and again supplied to pump 56 through conduit 62 (see FIG. 3). If, in a closed system, the use of the exhaust heat is not desired, a sufficiently long conduit 70 would be required to lower the steam temperature or a conventional condenser may be employed, in series between the engine exhaust and the coil of conduit 68.

Figure 4:
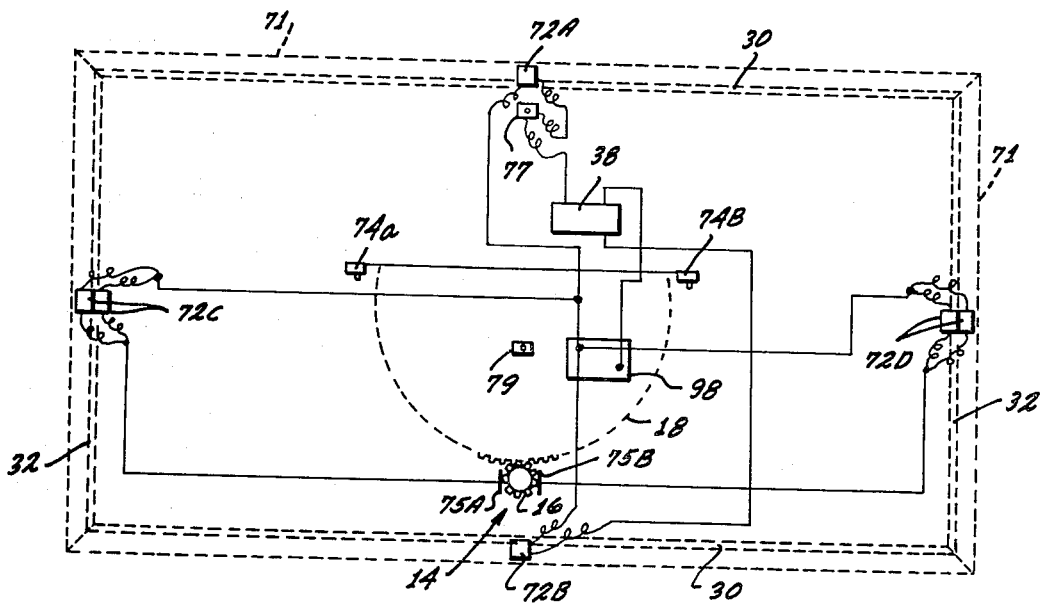
FIG. 4 is a diagrammatic view of the electrical wiring of the solar tracking mechanism of the invention.

Referring now to FIGS. 1-4, on each side 30, external of the collector, are positioned light sensing elements 72a, 72b, on each end 32 are positioned a pair of sensors 72c and 72d, in some applications a pair of sensors 72c and 72d may be required (see FIG. 4). These sensors may take many forms, such as, but not limited to, selenium photo cells, catalog number 276-115 and light activated silicon controlled rectifiers, catalog numer 276-1095, both are manufactured by Archer for Radio Shack, Inc., or the like. Referring now specifically to FIG. 1, a shield 74 is positioned adjacent to the sensors 72c and 72d preventing direct Sun light from the opposite side of the collector from striking their light sensitive surface. A pertusion or lip 71 is positioned around the upper surface of the collector panel for shielding the various sensors 72a, 72b, 72c and 72d which are adjacent thereto. The pertusion or lip has sufficient width to aid in shielding the Sun's light rays from its adjacent sensor when the collector is properly positioned with respect to reflecting the Sun's light rays from reflectors 64 to focal point 66.

The sensors 72c, 72d are interconnected to motor 14 so that when light strikes the sensors, the motor will be activated in a rotational direction to turn the collector until the light no longer strikes that sensor. The sensors 72a and 72b are positioned so that when they receive light rays from the Sun, they cause motor 38 to operate and tilt the collector until that sensor no longer receives the light rays.

Both motors operate in either rotational direction depending upon their requirement and hold their last activated position. The motors are either very slow rotating, such as a clock motor, or are connected to a speed step down gear box (not shown) to reduce their speed to that suitable for the above requirement.

A pair of normally closed switches 77, 79 are wired in series with sensors 72a, 72b respectively, which are in series with motor 38 and battery 98. The sensors have separate series circuits. Switch 77 is depressed when the bottom 24 is rotated to its maximum downward position causing the switch to engage bracket 83 attached to base 12. When contact is made, switch 77 opens the series circuit between sensor 72a and the motor causing the motor to be inoperative. When the bottom 24 is in its FIGS. 1 and 3 position, switch 79 engages bracket 85 and causes motor 38 to be inoperative in the opposite direction. This is a safety feature to prevent burn out of the motor. A similar pair of series circuits are provided with switches 74a and 74b that engage brackets 75a and 75b respectively to serve the same purpose as switch 77, 79 for apparatus rotating motor 14.

It should be obvious that when conduit 70 is connected external of the collector that a flexible conduit must be attached to its end to allow freedom of rotational and tilting movement with the collector as required. When operating as a closed system as hereinbefore mentioned, the conduit 70 may be a flexible conduit.

Referring now specifically to FIGS. 5 and 6, the valves 78 are actuated by the operation of their associated push rods 80. Push rods 80 bear against cam lobe 82 secured to drive shaft 52 for rotation therewith. Springs 81 return the valves to a normally closed position. The valves 78 are operable in a conventional manner to open at the required time so as to vent each flash steam boiler 54 when its associated piston reaches the end of its power stroke. The first showing of pump 56 was a block showing of a single conventional device well known in the diesel engine art or the like. Separate single pumps 56a are shown in FIGS. 5 and 6 as another example of a pump system that may be utilized equally as well to practice the invention. The two pumps 56a, as 56, may be supported by the cylinder through bracket 84 as an example, however, support means from the bottom 24 (not shown) may be utilized equally as well to practice the invention. The pumps 56a are actuated by means of cam 86 operating push rods 57. The pump actuators are internally biased to bear against the cam 86 at all times.

Referring now specifically to FIG. 1, in some circumstances a starter system will be required to initially turn shaft 52 so as to provide rotation of cam 86 to actuate the pumps 56a. The starter system includes a starter motor 88 having its rotor co-axial and attached with drive shaft 52. Actuation of the starter motor will turn shaft 52 at sufficient speed to properly actuate the pumps 56a.

The circuit for the starter motor includes a temperature sensitive switch 90 positioned preferrably adjacent one of the flash steam boilers and a second switch comprising an electrical conductive slip ring 94 positioned above a centrifugal fly weight 96 which is attached to the drive shaft 52. When drive shaft 52 turns the fly weight 96 at sufficient speed, it is caused to move away from slip ring 94 which in turn opens the starter motor circuit. Switch 90 and slip ring switch 94 are wired in series with the starter 88 and the battery 98 so that both are required to close to enable the starter motor to operate. Therefore, the starter motor will run only when the engine operation does not rotate shaft 52 at a speed that opens slip ring switch 94 and the temperature is sufficient to close switch 90. If either do not occur, in the absence of the Sun, the starter motor will remain inoperative. The power to operate the starter motor is supplied, for example, by battery 98. It should be understood that in some instances, it will be advantageous to combine the starter motor and generator into a single device in a known manner.

It should be understood that although two steam engine piston and cylinder combinations are shown and discussed, that a single piston and cylinder steam engine or more than two piston and cylinder combinations may be connected to the same drive shaft 52 depending on power requirements and space available. Each steam engine would require a separate concentrator.

OPERATION OF THE PREFERRED EMBODIMENT

The apparatus, as described, is positioned with its side 30 having motor 38 in a generally southerly direction and ends 32 in an east/west direction.

With the apparatus properly positioned with respect to the Sun, the rays will be reflected by each of the mirror segments 64 to their appropriate focal point 66 on the bottom surface of the flash steam boiler 54.

Assume that at a given time the Sun has not been visible for a period of time, and now reappears, the temperature of the collector is reduced below a predetermined level and the Sun's rays will not be directed to focal point 66 because of relative movement between the Sun and Earth. The Sun's light rays will strike sensors 72a, 72b, 72c, and 72d that are exposed to direct Sun light, activating the motors 38 and 14 to position the panel to focus on focal point 66.

In the afternoon, the sensors on the North and West would likely be exposed and in the morning, likely the South and East sensors would be exposed. The sensor or sensors receiving the Sun's light rays will cause their associated motor to operate sensors 72a and 72b in a rotational direction in which that sensor is directed away from direct contact with the Sun's rays and sensor 72c will cause counterclockwise rotation while 72d will cause clockwise rotation of motor 14. When the sensor is shielded from the Sun's rays, then its associated motor will stop and maintain its last rotational position. If a second sensor 72 has been activated, a similar operation will occur. When both of the motors are stopped, then the rays of the Sun will again be directed from the reflectors to the focal point 66 on the bottom surface of the flash steam boiler 54.

When the flash steam boiler reaches a predetermined temperature that is sufficient to maintain piston displacement and drive shaft rotation switch 90 will energize the starter motor 88. The speed of rotation of the starter motor is sufficient to cause the pistons to translate at an operable speed taking in consideration the load of the generator, pumps, and valves, but not sufficient to turn the fly weight 96 fast enough to disengage slip ring 94. When the normal operation of the device increases the speed of the pistons and drive shaft, the fly weight 96 will then rise and disengage the slip ring 94 and the starter motor circuit will then be de-energized.

As relative movement between the Sun and Earth is directed by the Sun's rays again striking the sensor or sensors, the positioning motors will be activated to reposition the collector so that the reflective surface will maintain their same focal point on the lower surface 66 to provide maximum heat collection.

As is well-known for servo-systems, some hunting between the motor's directional rotation may occur, but a slightly enlarged focal surface will allow the reflection to be positioned on the lower surface during normal hunting of the positioning system.

The positioning of the collector will continue to occur as long as Sun light is present. Absence of Sun light will cause the positioning to stop. When the Sun light is again present, a similar sequence of events will occur bringing the positioning apparatus into operation.

When the flash boiler temperature is such that the pistons will cause to operate, the switch 90 circuit is open preventing operation of the starter circuit as with the positioning apparatus, return of Sun light will provide a proper sequence of events bringing the engine into operation.

The invention may be embodied in other specific forms without departing from the spirit or essential characteristics thereof. The present embodiment is, therefore, to be considered in all aspects as illustrative and not restricting, the scope of the invention being indicated by the appended claims rather than by the foregoing description, and all changes which come within the meaning and range of equivalency of the claims are therefore intended to be embraced therein.

I claim:

1. Method for producing a light energy concentrator comprising the steps of:
    (a) selecting a flat base member of desirable size;
    (b) selecting a target member having a flat surface area of desirable size;
    (c) selecting a plurality of reflectors of a predetermined size;
    (d) positioning said target member above and substantially parallel with said flat surface facing said base member and at a distance from said base member determined by the size of said base member, the size of the flat surface of said target member and the size of said reflectors whereby each of said plurality of reflectors when properly positioned cast their entire reflected light within the flat surface of said target member;
    (e) marking an area equal to the size of the flat surface of said target member on said base member;
    (f) aligning said base member with respect to a source of light energy so that said target member casts a shadow within the boundaries of the marked off area on said base member;
    (g) positioning and securing a first one of said plurality of reflectors on said base member whereby all of the light from the light source reflected by it impacts said flat surface of said target member;
    (h) positioning and securing a next one of said plurality of reflectors on said base member so that all of the light reflected therefrom impacts said flat surface of said target member;
    (i) covering the reflective surface of said next one of said plurality of reflectors;
    (j) repeating steps (h) and (i) above for each of the remaining ones of said plurality of reflectors;
    (k) uncovering the covered reflective surfaces; and
    (l) removing said target member from its fixed position and discarding same.

2. A light energy concentrator produced by the method of claim 1.

3. The method of claim 1, including the additional step of placing said marked off area in substantially the center of said base member.

4. A light energy concentrator produced by the method of claim 3.

5. The method set forth in claim 1, including the additional step of filling the voids between said reflectors and said base members and said reflectors with a suitable filler material.

6. A light energy concentrator produced by the method of claim 5.

7. A method of producing a replica of the light energy concentrators of claims 2, 4, or 6 comprising the steps of:
 (a) coating the entire reflective surface of said light energy concentrator with a mold releasant material;
 (b) coating the entire mold releasant coated surface with a suitable material to form a master mold from said light energy concentrator;
 (c) removing the master mold from the reflective surface of said light energy concentrator;
 (d) coating the entire surface of said master mold formed on said reflective surface with a mold releasant material;
 (e) coating the release material coated surface of said master mold with a reflective material;
 (f) coating the back surface of said reflective coating with a suitable base material; and
 (g) removing said master mold from the combined reflective surface and suitable base material.

8. A replica of the light energy concentrator produced by the method of claim 7.

9. The method of claim 7 wherein the coating of step (e) comprises the placing of flat glass mirrors of substantially the same size and in the same position as on the light energy concentrator.

10. The method of claim 7, wherein the coating of step (e) comprises placing flat glass mirrors of diminishing dimensions, the largest being centrally located on the replica and being of reduced size toward the outer periphery thereof.

11. The light energy concentrator as defined in claim 10, wherein any spaces between said flat segmented reflectors and between said segmented reflectors and said base member are filled with a filler material.

12. The light energy concentrator as defined in claim 11, wherein said flat base member and plurality of reflectors are substantially rectilinear and said reflectors are glass mirror segments.

* * * * *